United States Patent
Low et al.

[15] 3,702,532
[45] Nov. 14, 1972

[54] ELECTROLYTIC GAS OPERATED ACTUATOR

[72] Inventors: George M. Low, Acting Administrator of the National Aeronautics and Space Administration with respect to an invention of; Peter G. Simmonds, 5200 Palm Drive, La Canada, Calif. 91011

[22] Filed: March 29, 1971

[21] Appl. No.: 129,072

[52] U.S. Cl. .................................60/23, 60/1, 60/37
[51] Int. Cl. .................................................F03g 7/00
[58] Field of Search..........................60/1, 23, 25, 37

[56] References Cited

UNITED STATES PATENTS

| | | | |
|---|---|---|---|
| 1,678,612 | 7/1928 | Walker | 60/1 |
| 2,411,089 | 11/1946 | Fredericks et al. | 60/1 |
| 3,587,227 | 6/1971 | Weingarten | 60/23 |

*Primary Examiner*—Edgar W. Geoghegan
*Assistant Examiner*—Allen M. Ostrager
*Attorney*—Monte F. Mott, Paul F. McCaul and John R. Manning

[57] ABSTRACT

An actuator incorporating an electrolytic gas generator-evacuator is disclosed. A membrane of material selectively permeable to a drive gas is inserted in a combined inlet-outlet of an expandable chamber. The membrane forms a portion of an electrolytic cell by being immersed in a body of electrolyte capable of transporting an ionic species of the drive gas between the membrane as one electrode and a counter electrode. By connecting the combined inlet-outlet of the chamber to the outside surface of the membrane and cyclically driving the electrolytic cell in a drive gas generation mode and a drive gas evacuation mode, the chamber will cyclically expand and contract.

9 Claims, 1 Drawing Figure

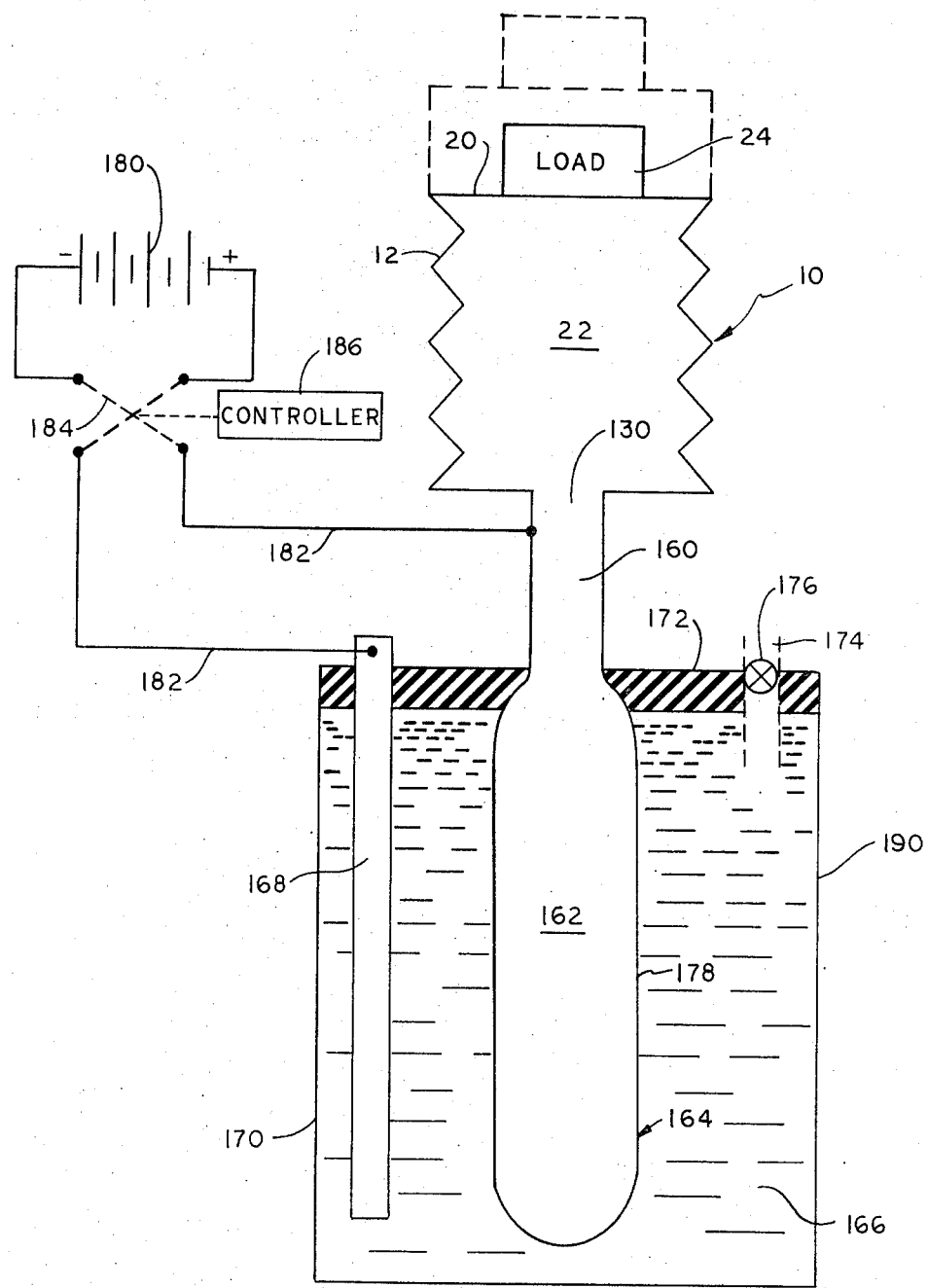

3,702,532

ELECTROLYTIC GAS OPERATED ACTUATOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 USC 2457).

BACKGROUND OF THE INVENTION

1. Field of the Invention

The present invention relates to gas operated actuators and more particularly, to an actuator incorporating an electrolytic drive gas generator and evacuator.

2. Description of the Prior Art

In companion application Ser. No. 147,997 filed on May 28, 1971 and titled Gas Operated Actuator, an actuator is described in which an expandable chamber is reciprocally driven by injecting and exhausting drive gas through films selectively permeable to drive gas when heated. Such actuators require an external supply of drive gas usually in the form of heavy and bulky gas storage cylinders and associated regulator valves if extended operation of the actuator is desired.

SUMMARY OF THE INVENTION

The actuator of this invention is a closed system and does not require the use of an external supply of drive gas. The drive gas in the actuator of the present invention is stored during an evacuation mode of operation and is continuously regenerated and returned to the actuator during an expansion mode of operation. The actuator has no moving parts, other than the chamber and requires no valves for operation.

The actuator includes a gas impermeable, expandable chamber having a combined, drive gas inlet-outlet incorporating a film or membrane of material selectively permeable to drive gas when heated. The obverse side of the film is in contact with a body of molten electrolyte capable of transporting an ionic species of the drive gas between the film as one electrode and a counter electrode. In one polarity mode, the electrolytic cell generates drive gas for expansion of the chamber and in the second polarity mode, the electrolytic cell operates in an evacuation mode to retract the expandable chamber. By connecting the cell to a polarity reversing switch, the chamber is cyclically expanded and retracted.

These and many other attendant advantages of the invention will become apparent as the invention becomes better understood by reference to the following detailed description when considered in conjunction with the accompanying drawings.

BRIEF DESCRIPTION OF THE DRAWING

The FIGURE is a schematic view of a gas operated actuator utilizing an electrolytic drive gas generator-evacuator.

DESCRIPTION OF THE PREFERRED EMBODIMENTS

The gas operated actuator illustrated in the FIGURE, obviates the need for a separate drive gas storage cylinder for expansion of the expandable chamber and provides a drive gas evacuation condition on the obverse side of the membrane during evacuation of drive gas from the chamber. Gas cylinders are heavy and add substantial weight to the actuator. The actuator of this embodiment incorporates features of the novel combined carrier gas generator-separator described in copending application, Ser. No. 7,922 filed Feb. 2, 1970, the disclosure of which is incorporated herein by reference.

Referring now to the FIGURE, the expandable bellows 12 has a combined inlet and outlet port 130 communicating through tubulation 160 with a chamber 162. The chamber is defined by a closed end tube 164 formed of a drive gas permeable material such as palladium alloy in the case of hydrogen drive gas and having at least one wall portion immersed in a body of electrolyte 166. The tube 164, electrolyte 166 and a counter electrode 168 form an electrolytic cell 190. The body of electrolyte 166 is housed in a container 170 having a top end plug 172 suitably formed of insulating material such as Teflon (polytetrafluoroethylene) through which the upper ends of the tube 164 and electrode 168 are inserted. The end plug 172 may also contain an exhaust relief port 174 containing a pressure relief valve 176.

The electrolyte contains a chemically combined species of drive gas such as water in the case of hydrogen. The cell is capable of dissociating the water into ionic species of hydrogen which combine at the outside surface 178 of the tubular electrode 164 and are transported through the walls thereof to form hydrogen which collects within chamber 162. The other ionic species is an oxidizing species such as hydroxyl ions or ionic oxygen which, in a second polarity mode, collect at the outside surface 178 of the tubular electrode 164 and combine with the hydrogen permeating therethrough to form water. This acts to pump hydrogen out of the chamber 162 and functions as an oxidizing fluid medium in the manner described in copending application Ser. No. 147,992, titled Gas Operated Actuator. Furthermore, the hydrogen gas is thus stored in the electrolyte 166 as water and is available as required, thereby, eliminating leakage problems associated with gas storage tanks, the weight of the tanks and the associated valving.

The electrode tube 164 and the counter electrode 168 are connected to a potential source 180 by conductors 182 through a polarity reversing switch 184. The polarity reversing switch may be controlled by a programmer controller 186.

The tubular electrode 164, counter electrode 168 and electrolyte 166 form an electro-chemical cell 190 capable of generating hydrogen within chamber 162 when operated in a first polarity mode and capable of evacuating hydrogen from chamber 162 when operated in the second polarity mode. The electro-chemical cell 190 thus functions as a combined generator-evacuator.

The counter electrode 168 may be formed of a variety of conductive materials, such as a strip of noble metal, such as platinum. The counter electrode 168 preferably takes the form of a closed tube formed of a hydrogen permeable palladium alloy. In this configuration, the hydrogen entering the electrolyte during operation in the evacuator mode, enters and is stored within the counter electrode tube 168. The cell is thus operated in a more stochiometric manner obviating the need to add water and the cell operated under less pressure from oxygen or hydrogen generated in the electrolyte compartment. This avoids the danger of rupturing the cell or the need for a pressure relief valve 176.

The cell containing a counter electrode hydrogen storage tube operates at lower power and at lower potential. During hydrogen generation the tubular electrode 168 operates as a fuel cell, which lowers the power requirement and operating voltage. The lower voltage requirement lessens the danger of approaching or exceeding the decomposition potential of the electrodes during operation.

The tubular electrode 168 is prefilled with hydrogen before operation of the cell. One simple manner of filling the tubular electrode 168 is to place a third electrode such as a strip of platinum within the electrolyte and connect it as an anode to a potential source while connecting the tubular electrode 168 as a cathode. Hydrogen will be generated and stored within the tubular electrode. The platinum strip is then removed and the cell assembled with tubular electrode 164.

The electrolyte is preferably a material capable of transporting an ionic species of the carrier gas from one electrode to the other, is inert with respect to the electrodes, is stable at temperature of operating the cell and is capable of regenerating the drive gas by electrolytic association or dissociation, as is required. The electrolyte may be an acid, a basic or salt material, but, is preferably an inorganic metal hydroxide.

The most suitable material for use in the generator-evacuator cell 190 of the invention are the Group I metal compounds or hydroxides. The hydroxides should be utilized in hydrated form, preferably containing 10 to 35 percent water of hydration. Since this both lowers the power requirement and the temperature at which the electrolyte becomes molten, improved operation of the cell occurs when at least 10 to 25 percent of the lighter weight lithium hydroxide is mixed with sodium or potassium hydroxide, preferably the latter. Commercial potassium hydroxide containing 25 percent water melts at 275°C. The addition of 10 percent lithium hydroxide to this electrolyte further lowers the temperature at which the electrolyte becomes molten to about 200°C.

To maintain the palladium containing electrode tube 164 at a hydrogen permeable temperature, the cell may be heated by various means such as by disposing it in an oven or by heating the container 170 by means of an external electrical heating coil or some other suitable heating arrangement.

Though it is desirable to maintain the resistance of the electrodes and electrolyte, as low as possible for purposes of electrical power efficiency, the electrolytic cell may in some configurations, provide a sufficient internal impedance to produce the desired heating by passage of current through the electrodes and electrolyte. Thus, the electrolysis current supplied by the power source 180 may be utilized to provide the necessary heat to maintain the electrode tube 164 at a hydrogen permeable temperature. When the electrolytic cell 190 is connected to the potential source 180 through the polarity reversing switch 184, such that the electrode tube 164 is a cathode and the counter electrode 168 is the anode, hydrogen is transferred from tubular electrode 168 and passes into the electrolyte. The separated hydrogen is transported ionically by the electrolyte to the surface of tubular electrode 164 and passes through the heated wall of the tube 164 and collects within the chamber 162. The pressure will increase as long as potential is applied up to a maximum pressure of about 600 psi. The hydrogen will expand through tubulation 160 into chamber 22 and will expand bellows 12 to raise the load 24 to the extended position, as indicated by the dotted lines in the FIGURE.

Since only a small volume of hydrogen is required to operate the actuator 10, the amount of oxygen concurrently generated is of reasonable volume and is not expected that the container 170 will be unduly overpressured. However, if pressure within the container 170 rises to too high a level, provision of venting may be provided by means of the relief valve 176.

The bellows 12 is retracted by reversing the electrical connections to electrodes 164 and 168 by means of polarity reversing switch 184. In this polarity mode, the palladium containing tube 164 is anodic, and the platinum electrode 168 is cathodic. Hydrogen gas in the chamber 162 will then pass through the heated wall of the tube 164 and will be ionically transported by the electrolyte to the surface of tube 168 and will traverse the heated wall of tube 168 and collect therein. The cell 190 is operated in this mode until the bellows is fully retracted.

If the cell 190 and bellows 12 and tube 160 are all leak-tight, a perfect balance will be maintained, and thus, none of the water originally contained in the electrolyte will be lost. However, in the event that pressure relief valve 176 is operated there may be some loss of gases which could produce a reduction in the amount of water available for decomposition. The loss of these chemicals can be accommodated by replenishing water to the electrolyte 166, suitably by utilizing an automatic water replenishing arrangement from a water reservoir.

Loss of hydrogen from any closed system over a period of time is possible because hydrogen is capable of permeating through many materials, even metal. The present actuator minimizes this loss by returning hydrogen from the bellows 12 for storage in the electrolyte in the form of water. The bellows 12 can be maintained in extended position despite the loss of hydrogen through the walls of the bellows or other portions of the system by compensating for such loss by adjusting the decomposition current to a very low level to generate a small flow of hydrogen necessary to replenish that lost by leakage from the system.

For extremely long periods of latching the actuator in extended position, it may be desirable to apply the decomposition current in pulse form from the programmer controller 186 which applies pulsed signals to switch 184. Spaced negative pulses could be applied to tubular electrode 164 to generate small amounts of hydrogen. During the pulse off periods, hydrogen would slowly diffuse back through the wall of tube 184 into the electrolyte. The period of the on and off pulses may also be utilized to maintain the desired extension of the bellows or to reduce the possibility of overpressurization of either the bellows or of the cell.

Programmed pulses may also be used to produce a reciprocating or oscillating action of the bellows or any mechanism connected to it. Reciprocation of the bellows may be accentuated by utilizing pulses having positive and negative portions of suitable duration. Application of positive pulses increases the rate of diffusion of the hydrogen back into the electrolyte by forming an oxidizing fluid medium on the outside surface 178 of the tube 164. The programmer controller 186 may also be actuated by limit switches at both ends of the bellows travel for generating a signal for reversing the polarity that the source 180 applies to the cell 190.

The expandable chamber can also comprise a piston cylinder enclosing the chamber and which is expanded in volume by movement of a piston therein. The chamber is defined by a drive gas impermeable enclosure having at least one moveable wall which extends in a linear direction without substantial linear movement on increase of pressure within the chamber.

It is to be understood that only preferred embodiments of the invention have been described and that numerous substitutions, modifications and alterations are all permissible without departing from the spirit and scope of the invention as defined in the following claims.

What is claimed is:

1. A gas operated actuator including in combination:
    container means defining a drive gas impermeable, expandable chamber and having a combined drive gas inlet and drive gas outlet;
    a thin film selectively permeable to the drive gas when heated interposed in said inlet-outlet and having a first surface facing said chamber;
    a body of electrolytic fluid disposed in contact with the obverse surface of said film, said fluid being capable of electrolytically transporting ionic species of the drive gas between electrodes;
    a counter electrode disposed in contact with said body of fluid; and
    potential means connected to said film and counter electrode forming an electrolytic cell through said body of fluid and for heating said film to the drive gas's permeable temperature for the generation and evacuation of drive gas through said film.

2. An actuator according to claim 1 in which said drive gas is hydrogen and said film comprises palladium.

3. An actuator according to claim 2 in which said film is selected from the group consisting of palladium and alloys thereof with silver, gold or rhodium.

4. An actuator according to claim 2 in which said electrolyte comprises a hydrated inorganic metal hydroxide.

5. An actuator according to claim 4 in which the electrolyte contains 10 to 35 percent water of hydration and is a mixture of sodium or potassium hydroxide with 10 to 25 percent of lithium hydroxide.

6. An actuator according to claim 1 in which said potential means includes a polarity reversing switch for rendering said film anodic for generation of drive gas through said film to expand said chamber in a first polarity mode and for rendering said film cathodic for evacuation of drive gas through said film into said electrolyte fluid in a second polarity mode.

7. An actuator according to claim 1 in which said container means comprises a gas expandable bellows.

8. An actuator according to claim 1 in which said film comprises a hollow tubular body having a closed end immersed in said body and an open end communicating with the combined inlet-outlet.

9. An actuator according to claim 8 in which the counter electrode comprises a closed, hollow tubular member formed of a material permeable to drive gas when heated whereby drive gas is stored in said member during an evacuation mode of operation and is supplied by the member during a drive gas generation mode of operation.

* * * * *